US008901026B2

(12) United States Patent
Wormsbecher et al.

(10) Patent No.: US 8,901,026 B2
(45) Date of Patent: Dec. 2, 2014

(54) GASOLINE SULFUR REDUCTION CATALYST FOR FLUID CATALYTIC CRACKING PROCESS

(75) Inventors: Richard Franklin Wormsbecher, Dayton, MD (US); Ruizhong Hu, Cooksville, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 1411 days.

(21) Appl. No.: 12/527,232

(22) PCT Filed: Jan. 28, 2008

(86) PCT No.: PCT/US2008/001094
§ 371 (c)(1),
(2), (4) Date: Nov. 12, 2009

(87) PCT Pub. No.: WO2008/103224
PCT Pub. Date: Aug. 28, 2008

(65) Prior Publication Data
US 2010/0133145 A1    Jun. 3, 2010

Related U.S. Application Data

(60) Provisional application No. 60/902,456, filed on Feb. 21, 2007.

(51) Int. Cl.
*B01J 29/08* (2006.01)
*B01J 23/06* (2006.01)
*B01J 23/10* (2006.01)
*C10G 11/05* (2006.01)
*C10G 11/18* (2006.01)
*B01J 29/06* (2006.01)

(52) U.S. Cl.
CPC ............... *B01J 29/088* (2013.01); *C10G 11/18* (2013.01); *B01J 2229/18* (2013.01); *B01J 2229/20* (2013.01); *C10G 2400/02* (2013.01); *C10G 11/05* (2013.01); *C10G 2300/1037* (2013.01); *B01J 29/061* (2013.01); *B01J 2229/42* (2013.01); *C10G 2300/202* (2013.01); *B01J 2229/186* (2013.01)
USPC .................. 502/73; 502/65; 502/68; 502/79; 502/250; 502/263; 208/120.01; 208/120.25

(58) Field of Classification Search
USPC .......... 502/65, 68, 73, 79, 250, 263; 208/118, 208/119, 120.01, 120.25
See application file for complete search history.

(56) References Cited

U.S. PATENT DOCUMENTS

| | | | |
|---|---|---|---|
| 3,293,192 A | 12/1966 | Maher et al. | 252/430 |
| 3,402,996 A | 9/1968 | Maher et al. | 23/112 |
| 3,607,043 A | 9/1971 | McDaniel et al. | 23/111 |
| 3,676,368 A | 7/1972 | Scherzer et al. | 252/455 Z |
| 3,804,780 A | 4/1974 | Wilson et al. | 252/455 Z |
| 4,340,465 A | 7/1982 | Miller et al. | 208/120 |
| 4,405,443 A | 9/1983 | Bertolacini et al. | 208/113 |
| 4,542,116 A | 9/1985 | Bertolacini et al. | 502/65 |
| 4,664,780 A | 5/1987 | Lochow et al. | 208/120 |
| 4,764,269 A | 8/1988 | Edwards et al. | 208/120 |
| 4,790,982 A | 12/1988 | Yoo et al. | 423/239 |
| 4,793,827 A | 12/1988 | Lochow et al. | 44/65 |
| 4,957,718 A | 9/1990 | Yoo et al. | 423/244 |
| 4,957,892 A | 9/1990 | Yoo et al. | 502/63 |
| 4,963,520 A | 10/1990 | Yoo et al. | 502/64 |
| 5,021,146 A | 6/1991 | Chin | 208/122 |
| 5,037,531 A | 8/1991 | Bundens et al. | 208/120 |
| 5,037,538 A | 8/1991 | Chin et al. | 208/113 |
| 5,043,308 A | 8/1991 | Luetkens, Jr. et al. | 502/204 |
| 5,258,341 A | 11/1993 | Chitnis et al. | 502/68 |
| 5,294,332 A | 3/1994 | Klotz | 208/120 |
| 5,376,608 A | 12/1994 | Wormsbecher et al. | 502/61 |
| 5,525,210 A | 6/1996 | Wormsbecher et al. | 208/122 |
| 5,908,547 A | 6/1999 | Chitnis et al. | 208/120.01 |
| 6,069,012 A | 5/2000 | Kayser | 436/37 |
| 6,096,194 A | 8/2000 | Tsybulevskiy et al. | 208/244 |
| 6,214,211 B1 | 4/2001 | Itoh | 208/118 |
| 6,482,315 B1 | 11/2002 | Roberie et al. | 208/249 |
| 6,528,447 B1 | 3/2003 | Ghosh et al. | 502/65 |
| 6,635,168 B2 | 10/2003 | Zhao et al. | 208/120.01 |
| 6,635,169 B1 | 10/2003 | Bhore et al. | 208/120.2 |
| 6,776,899 B2 | 8/2004 | Lam et al. | 208/120.01 |
| 2002/0043154 A1 | 4/2002 | Shore | 95/135 |
| 2002/0153282 A1 | 10/2002 | Cheng et al. | 208/120.2 |

(Continued)

FOREIGN PATENT DOCUMENTS

| | | |
|---|---|---|
| JP | 2004066035 | 3/2004 |
| SU | 01786718 | 1/1991 |
| WO | 02 08300 | 1/2002 |

OTHER PUBLICATIONS

U.S. Appl. No. 10/801,424, filed Sep. 22, 2005, Ruizhong, Hu.
Krishna et al., "Additives Improved FCC Process/Hydrocarbon Process", Hydrocarbon Processing, Nov. 1991, pp. 59-66.
American Chemical Society Symposium Series, Contaminant-Metal Deactivation and Metal-Dehydrogenation Effects During Cyclic Propylene Steaming of Fluid Catalytic Cracking Catalysts, No. 634, Chapter 12, pp. 171-183 (1996) by L.T. Boock, T.F. Petti, and J.A. Rudesill.
Breck, D.W., "Zeolite Molecular Sieves". Structural Chemistry & Use (1974) p. 94.

(Continued)

*Primary Examiner* — Renee E Robinson
(74) *Attorney, Agent, or Firm* — Charles A. Cross

(57) ABSTRACT

A catalytic cracking catalyst composition is disclosed that is suitable for reducing the sulfur content of catalytically cracking liquid products, in particularly gasoline products, produced during a catalytic cracking process. Preferably, the catalytic cracking process is a fluidized catalytic cracking (FCC) process. The composition comprises zeolite, zinc and at least one rare earth element having an ionic radius of less than 0.95 Å at a coordination number of 6. Preferably, zinc and the rare earth element are present as cations that have been exchanged on the zeolite. The zeolite is preferably a Y-type zeolite.

28 Claims, 4 Drawing Sheets

(56) References Cited

U.S. PATENT DOCUMENTS

| | | | |
|---|---|---|---|
| 2002/0179498 A1 | 12/2002 | Chester et al. | 208/230 |
| 2003/0171634 A1* | 9/2003 | Corma | 585/648 |
| 2004/0266608 A1* | 12/2004 | Long et al. | 502/68 |
| 2005/0205464 A1 | 9/2005 | Hu | 208/113 |

OTHER PUBLICATIONS

Venuto and Habib, Fluid Catalytic Cracking with Zeolite Catalysts, Marcel Dekker, New York 1979, ISBN 0-8247-6870-1, pp. 32-37.

Sadeghbeigi, Fluid Catalytic Cracking Handbook, Gulf Publ. Co. Houston, 1995, ISBN 0-88415-290-1.

Albro et al. "Quantitative Determination of Sulfur Compounds in FCC Gasolines" by AED—A Study of the Effect of Catalyst Type & Catalytic Conditions on Sulfur Distribution, Journal of High Resolution Chromatography, vol. 16, Jan. 1993.

Studies in Surface Science and Catalysis, "Fluid Catalytic Cracking: Science and Technology", vol. 76, Ch 4, p. 141, Ed. Magee, J.S. and Mitchell, Jr., M.M., (1993).

Wormsbecher et al., National Petroleum Refiners Mtg., New Orleans, paper AM-92-15 (1992).

"Commercial Preparation and Characterization of FCC Catalysts", Fluid Catalytic Cracking: Science and Technology, Studies in Surface Science and Catalysis, vol. 76, p. 120 (1993).

Krishna, Sadeghbeigi. op cit & Scherzer, "Octane Enhancing Zeolitic FCC Catalysts", Marcel Dekker, New York, 1990, ISBN 0-8247-8399-9, pp. 165-178.

Shannon, D. and Prewitt, C. T., "Effective Ionic Radii in Oxdies and Fluorides*" Acta Cryst. (1969): B25, p. 925.

Shannon, R. D. and Prewitt, C. T., "Revised values of effective ionic radii.*" Acta Cryst., (1970) B26, 1046.

* cited by examiner

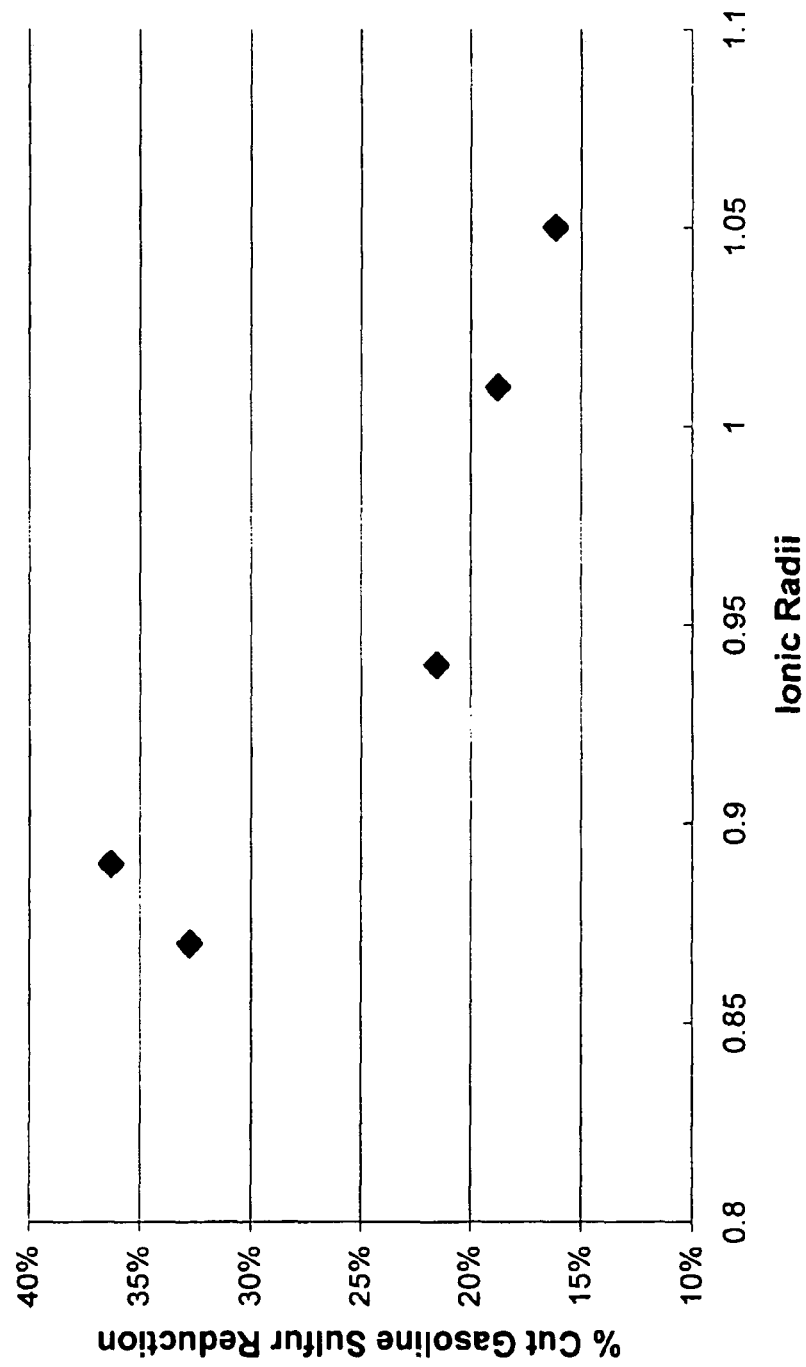

GASOLINE SULFUR REDUCTION CATALYST FOR FLUID CATALYTIC CRACKING PROCESS

CROSS-REFERENCE TO RELATED APPLICATION

This application claims priority and the benefit of the filing date of U.S. Provisional Patent Application No. 60/902,456 filed Feb. 21, 2007, and International Application No. PCT/US2008/001094 filed Jan. 28, 2008, the disclosures of which are hereby incorporated herein by reference.

FIELD OF THE INVENTION

The present invention relates to the reduction of product sulfur in gasoline and other petroleum products produced during a catalytic cracking process. In particular, the present invention relates to improved catalytic cracking catalyst compositions for reducing product sulfur and the method of using the compositions during a catalytic cracking process, i.e. a fluid catalytic cracking process, to reduce the content of sulfur in liquid products, e.g. gasoline.

BACKGROUND OF THE INVENTION

Catalytic cracking is a petroleum refining process that is applied commercially on a very large scale. Indeed, fluidized catalytic cracking (FCC) processes produce a large amount of the refinery gasoline blending pool in the United States. In the process, heavy hydrocarbon feedstocks are converted into lighter products by reactions taking place at elevated temperatures in the presence of a catalyst, with the majority of reactions taking place in the vapor phase. The feedstock is thereby converted into gasoline, distillates and other liquid fraction product streams as well as lighter gaseous cracking products having four or less carbon atoms per molecule. The three characteristic steps of a catalytic cracking process comprises: a cracking step in which the heavy hydrocarbon feed stream is converted into lighter products, a stripping step to remove adsorbed hydrocarbons from the catalyst material, and a regeneration step to burn off coke formations from the catalyst material. The regenerated catalyst is then recirculated and reused in the cracking step.

Catalytically cracked feedstocks normally contain organic sulfur compounds, such as mercaptans, sulfides, thiophenes, benzothiophenes, debenzothiophenes, and other sulfur-containing species. The products of the cracking process correspondingly tend to contain sulfur impurities even though about half of the sulfur compounds are converted to hydrogen sulfide during the cracking process, mainly by catalytic decomposition of non-thiophenic sulfur compounds. See, Wormsbecher et al., National Petroleum Refiners Meeting, New Orleans, paper AM-92-15 (1992). The thiophenic compounds have been found to be most difficult to remove. The specific distribution of sulfur in the cracking products is dependent on a number of factors including feed, catalyst type, additives present, conversion and other operating conditions, but in any event a certain proportion of the sulfur tends to enter the light or heavy gasoline fractions and passes over into the product pool, including sulfur from light cycle oil fractions, discussed later below.

Although petroleum feedstock normally contains a variety of sulfur bearing contaminants, one of the chief concerns is the presence of unsubstituted and hydrocarbyl substituted thiophenes and their derivatives, such as thiophene, methylthiophene, ethyl thiophene, propylthiophene, tetrahydrothiophene, benzothiophene and the likes in the heavy and light gasoline fraction product streams of FCC processes. The thiophenic compounds generally have boiling points within the range of the light and heavy gasoline fractions and, thus, become concentrated in these product streams. With increasing environmental regulation being applied to petroleum products, for example in the Reformulated Gasoline (RFG) regulations, there has been numerous attempts to reduce the sulfur content of the products, especially those attributable to thiophenic compounds.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach has been to remove the sulfur from the cracked products by hydrotreating. Again, while effective, this solution has the drawback that valuable product octane may be lost when the high octane olefinic components become saturated.

From an economic pointy of view, it would be desirable to achieve sulfur removal in the cracking process itself since this would effectively desulfurize the major components of the gasoline blending pool without additional treatment. Various catalytic materials have been developed for the removal of sulfur during the FCC process cycle. For example, an FCC catalyst impregnated with vanadium has been shown to reduce the level of product sulfur (See U.S. Pat. No. 6,482, 315). This reference also discloses a sulfur reduction additive based on a zinc-impregnated alumina.

Other developments for reducing product sulfur have involved the removal of sulfur from the regenerator stack gases. For example, alumina compounds have been added as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed (See Krishna et al., *Additives Improved FCC Process*, Hydrocarbon Processing, November 1991, pages 59-66). Although sulfur is removed from the stack gases of the regenerator, liquid product sulfur levels are not greatly affected, if at all.

An alternative technology for the removal of sulfur oxides from regenerator stack gases is based on the use of magnesium-aluminum spinels as additives to the circulating catalyst inventory in the FCC unit (FCCU). Exemplary patents disclosing this type of sulfur removal additives include U.S. Pat. Nos. 4,963,520; 4,957,892; 4,957,718; 4,790,982 and others. Again, however, sulfur content in liquid products, such as gasoline, was not greatly affected.

A catalyst composition to reduce sulfur levels in liquid cracking products has been described by Wormsbecher and Kim in U.S. Pat. Nos. 5,376,608 and 5,525,210. These patents propose the addition of low amounts of an additive composed of an alumina-supported Lewis Acid to conventional zeolite-containing cracking catalyst. Although this system has the advantages of causing sulfur reduction in the cracking process, it is generally believed that use of greater than about 10 weight percent of the described additives in the catalyst composition does not provide a benefit (e.g. high sulfur removal while retaining the selectivity of other products) proportional to the level of the additive. In view of the fact that an FCCU can only contain a fixed amount of fluidized particulates, the inclusion of additives, such as the alumina-supported Lewis Acid additives of Wormsbecher and Kim, causes a reduction in the amount of the base cracking catalyst contained in the FCCU and thus, a proportional reduction in the conversion of heavy feedstock to desired products.

U.S. Pat. No. 6,635,268 discloses a FCC catalyst composition composed of Lewis Acid-containing alumina and Y-type zeolite containing catalyst to provide a composition having a kinetic conversion activity of at least 2. The compositions described in U.S. Pat. No. 6,635,168 provide a reduced sulfur (e.g., thiophenes and derivatives thereof) content in light and heavy gasoline fractions of the FCC processes, (about 34%).

In U.S. patent application Ser. No. 10/801,424 filed on Mar. 16, 2004, a gasoline sulfur reduction cracking catalyst composition comprising a zeolite in combination with a Lewis Acid containing component, wherein the cracking catalyst composition comprises 0.2% $Na_2O$ or less, is disclosed.

Governmental sulfur standards continue to become more stringent. This is evidenced by the fact that the U.S. Environmental Protection Agency has recently set new standards for gasoline sulfur content and is reducing the average from the current standard of 350 ppm sulfur to about 30 ppm by 2006. Consequently, there exists a need to the refining industry for catalyst compositions and processes that are effective for reducing the product sulfur of liquid cracking products, e.g. gasolines, without minimizing conversion, e.g. overall cracking activity and product selectivity.

SUMMARY OF THE INVENTION

The essence of the present invention lies in the discovery that a relationship exists between the ionic radii of rare earth elements incorporated into a zinc containing zeolitic cracking catalyst composition and the sulfur reduction capability of the catalyst composition under catalytic cracking conditions. Unexpectedly, it has been discovered that the percent of sulfur reduction increased with a decrease in the ionic radii of the rare earth elements comprising the catalyst compositions. Accordingly, the present invention provides novel zeolite containing catalytic cracking compositions which comprise zinc in combination with elements having a specified ionic radius.

For purposes of the present invention, the term "rare earth" is used herein to designate a group of elements of Group IIIB of the Periodic Table having an atomic number ranging from 57 to 71. The term "heavy rare earth element" or "heavy rare earth" is used herein interchangeably to designate a rare earth element having an atomic number ranging from 63 to 71 and having an ionic radius of less than 0.95 Å at coordination number (CN) of 6. For purposes of this invention, the term "light rare earth element" or "light rare earth" is used herein interchangeably to designate a rare earth element having an atomic number ranging from 57 to 62.

Catalyst compositions of the present invention comprise a zeolite having catalytic cracking activity under catalytic cracking conditions, zinc and at least one heavy rare earth element. The heavy rare earth element and zinc are generally present in the catalyst compositions as cations which cations have been exchanged onto the zeolite. Preferably, the zeolite is a faujasite zeolite.

Catalyst compositions in accordance with the present invention exhibit improved reduction in the content of sulfur in liquid petroleum products produced during a catalytic cracking process when compared to zeolitic cracking catalyst comprising rare earth cations having an ionic radius of 0.95 Å or greater at a CN or 6. Advantageously, catalyst compositions of the invention accomplish an improved product sulfur reduction simultaneously with an increase in hydrocarbon conversion.

The present invention also provides an improved process for reducing the sulfur content of liquid petroleum products produced during a catalytic cracking process. In a preferred embodiment of the invention the catalytic cracking process is a fluidized catalytic cracking process (FCC). In accordance with this embodiment, the process comprises contacting a hydrocarbon feed comprising organosulfur compounds under FCC conditions with a circulating fluidized catalytic cracking catalyst inventory comprising the compositions of the invention to produce liquid cracked petroleum products including gasoline having a reduced sulfur content.

Accordingly, it is an advantage to provide catalytic cracking catalyst compositions having the ability to reduce the sulfur content of liquid products produced during a catalytic cracking process.

It is another advantage of the present invention to provide fluid catalytic cracking compositions having an increased ability to reduce the sulfur content of liquid products, in particular gasoline, produced during a fluid catalytic cracking process.

It is also an advantage of the present invention to provide FCC catalyst compositions which exhibit increased sulfur reduction in liquid products produced during an FCC process while simultaneously with an increase in hydrocarbon conversion.

It is also an advantage of the present invention to provide FCC processes using compositions and processes in accordance with the present invention.

These and other aspects of the present invention are described in further detail below.

BRIEF DESCRIPTION OF THE DRAWINGS

FIG. 4 is a graphic representation of the sulfur reduction (%) of cut gasoline product versus the ionic radii of exchanged rare-earth cations.

DETAILED DESCRIPTION OF THE INVENTION

Figure 1:
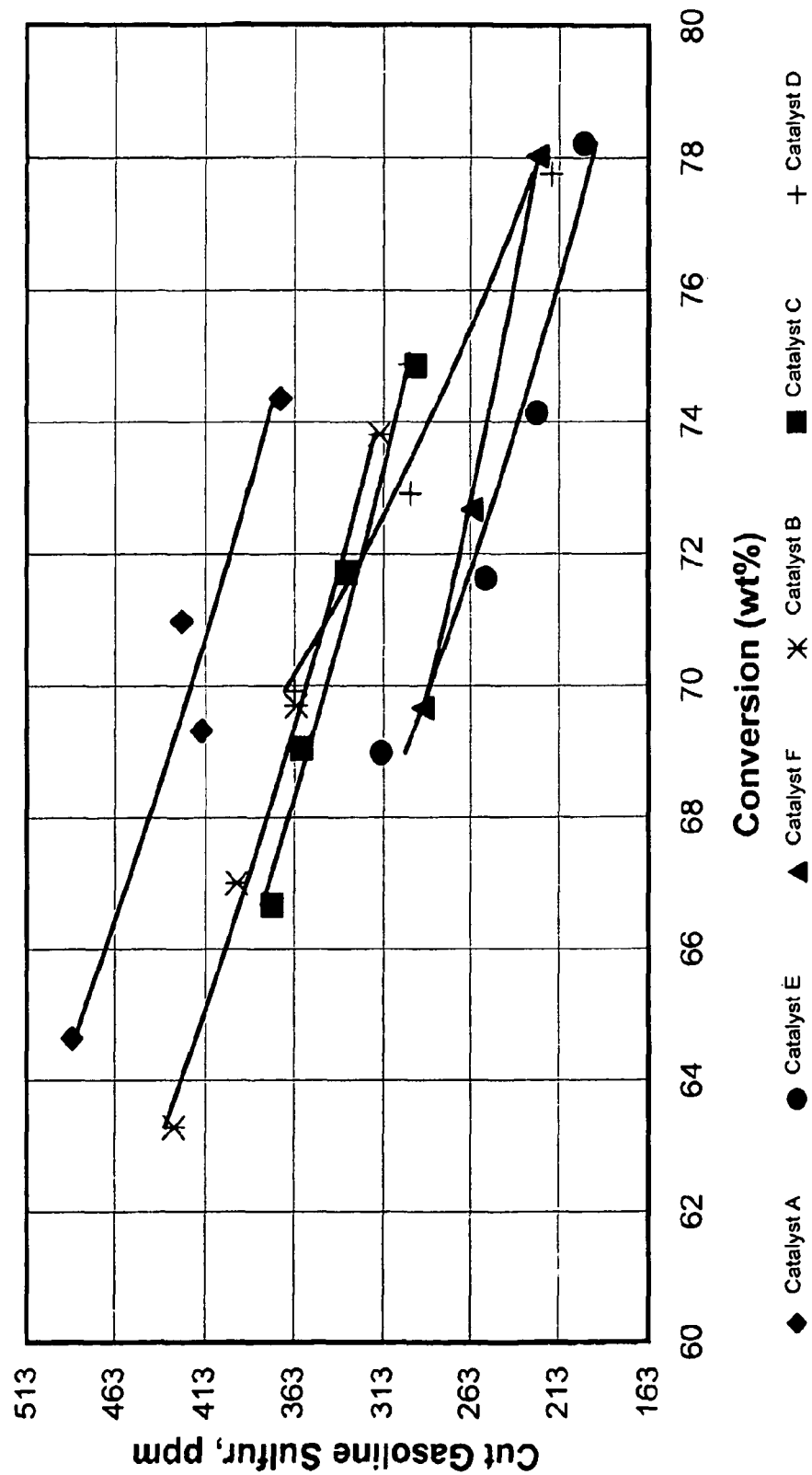
FIG. 1 is a graphic representation of the hydrocarbon conversion (wt %) versus sulfur content (ppm) of cut gasoline product obtained during ACE testing of inventions catalysts A, B, C, D, E and F, following deactivation of the catalysts using a CPS protocol as described hereinbelow.

Catalyst compositions of the present invention generally comprise a zeolite, zinc and at least one heavy rare earth element. The invention compositions are typically particulate compositions in a form capable of being maintained within an FCC unit during an FCC process. FCC catalysts typically contain zeolite, typically incorporated into a matrix and/or a binder. See "Commercial Preparation and Characterization of FCC Catalysts", *Fluid Catalytic Cracking: Science and Tech-* nology, Studies in Surface Science and Catalysis, Vol. 76, p. 120 (1993). FCC catalysts typically have average particle sizes in the range of about 20 to about 100 microns.

Catalyst compositions of the invention typically comprise a particulate composition comprising particles of a catalytically cracking active zeolite component in combination with zinc and at least one heavy rare-earth element, e.g. a rare-earth element having an ionic radius of less than 0.95 Å at CN equals 6. See Table 1 below:

TABLE 1

Ionic Radii of Heavy Rare Earth Ions at +3 oxidation (CN = 6)*

| Rare Earth | | | | | | | | |
|---|---|---|---|---|---|---|---|---|
| Eu | Gd | Tb | Dy | Ho | Er | Tm | Yb | Lu |
| Ionic Radii (Å) 0.947 | 0.938 | 0.923 | 0.912 | 0.901 | 0.890 | 0.880 | 0.868 | 0.861 |

*76th Edition, Handbook of Chemistry and Physics. For additional information, See Shannon, D. and Prewitt, C. T., Acta Cryst., 25, 925, 1969 and Shannon, R. D. and Prewitt, C. T., Acta Cryst., 26, 1046, 1970.

Preferably, the zinc component and heavy rare earth element are exchanged into the zeolite component. In a preferred embodiment of the invention, the zeolite particles are bound with an inorganic binder. The catalyst compositions of the invention are generally added to the circulating inventory of catalytic cracking catalyst during an FCC process as a separate catalyst particle.

Zeolites useful to prepare the catalyst compositions of the present invention include any zeolite having catalytic activity to convert hydrocarbons during a catalytic cracking process, in particularly an FCC process. Preferably, the zeolite is capable of being ionically exchanged with zinc and heavy rare earth elements used to prepare the catalysts of the invention catalyst. The zeolite may be large pore zeolites that are characterized by a pore structure or a medium or intermediate pore size zeolite having a pore size smaller than 0.7 nm but larger than about 0.56 nm. Suitable large pore zeolites comprise crystalline alumino-silicate zeolites such as synthetic faujasite, i.e. type Y zeolite, type X zeolite, and Zeolite Beta. Suitable medium pore size zeolite include, but are not limited to, zeolites such as ZSM-5, ZSM-22, ZSM-23, ZSM-35, ZSM-50, ZSM-57, MCM-22, MCM-49, MCM-56, all of which are well-known in the arts. Other zeolites that may be used include those zeolites with framework metal elements other than alumina, for example, boron, gallium, iron and chromium.

In a preferred embodiment of the invention, the zeolite is a synthetic faujasite zeolite such as type Y zeolite. It is also contemplated that the zeolite component may comprise a mixture of zeolites such as a synthetic faujasite in combination with at least one other type of zeolite, e.g. mordenite, Beta zeolites and ZSM type zeolites.

Generally, the zeolite component comprises from about 5 wt % to about 90 wt % of the invention catalyst. Preferably, the zeolite comprises from about 10 wt % to about 60 wt % of the invention catalyst, most preferably, from about 20 wt % to about 50 wt % of the catalyst composition.

Catalyst of the present invention also comprises zinc and at least one heavy rare earth element. Heavy rare earth elements useful to prepare catalyst in accordance with the present invention are generally those rare earth elements as shown in Table 1 above. Typically, rare metals useful in the present invention are heavy rare earth elements having an ionic radius of less than 0.95 Å, preferably less than 0.90 Å, at a CN=6.

Suitable heavy rare earth elements include those selected from the group consisting of europium, gallolinium, terbium, dysprosium, holmium, erbium, thulium, ytterbium, lutetium and mixtures thereof. Preferably, the rare earth elements are selected from the group consisting of erbium, thulium, ytterbium, lutetium and mixtures thereof.

The heavy rare earth and zinc components in the invention catalysts are generally provided from an inorganic salt compound. Suitable salt includes halides, carbonates, sulfates, nitrates, acetates and the like. Typically, the salts are provided as an aqueous solution. As will be understood by one skilled in the arts, the concentration of zinc and/or heavy rare earth element in the aqueous salt solution will vary depending upon the amount of zinc and/or heavy rare earth element desired in the final catalyst composition. In general, the concentration of zinc in the aqueous salt solution is from about 0.10 to about 40 wt %, measured as ZnO. The concentration of heavy rare earth in the aqueous salt solution is from about 0.10 to about 35 wt %, based on the rare earth metal oxide. As will be understood by one skilled in the arts, the zinc and heavy rare earth components may be added individually in separate salt solutions or simultaneously in a mixed salt solution.

The specific amount of zinc and heavy rare earth component used in the catalyst of the invention will vary depending upon factors, including but not limited to, the amount of zeolite present, the ion exchange capacity of the zeolite, and the process of incorporating the zinc and heavy rare earth components into or onto the catalyst.

In general, the aforementioned zinc and heavy rare earth components are present in the invention catalyst as cations pre-exchanged into the zeolite prior to incorporation of the zeolite in the catalyst. When pre-exchanged into the zeolite, the amount of zinc and heavy rare earth cations will be determined by the number of available exchangeable sites within the framework of the zeolite. For example, if one chooses a particular amount of zinc, the maximum amount of heavy rare earth component will be dependent on the amount of zinc chosen, and visa versa.

In general, when exchanged into the zeolite, the amount of zinc ions typically ranges from about 10% to about 90% of the available exchangeable sites and the heavy rare earth ions will typically range from about 90% to about 10% of available exchangeable sites on the zeolite.

Alternatively, the zinc and/or heavy rare earth component may be incorporated into the catalyst as a component during catalyst manufacture or impregnated onto the catalyst following manufacture or preparation of the catalyst.

The amount of zinc in the catalyst composition of the invention generally ranges from about 0.15 wt % to about 15 wt %, preferably from about 0.5 wt % to about 5 wt %, of the total catalyst. The amount of heavy rare earth element present in the catalyst composition of the invention is typically in the range of from about 0.22 wt % to about 22 wt %, preferably about 0.75 wt % to about 7.5 wt %, of the total catalyst, where the rare earth is incorporated into the catalyst or impregnated onto the catalyst.

Catalytic cracking catalyst compositions of the invention may optionally comprise one or more matrix materials. Suitable matrix materials optionally present in the catalyst of the invention include alumina, silica, silica-alumina, oxides of transition metals and mixtures thereof. Preferably, the matrix materials include alumina, silica, silica-alumina and mixtures thereof. The matrix material may be present in the invention catalyst in an amount of up to about 90 wt %, preferably about 20 wt % to about 80 wt %, of the catalyst composition. Catalyst compositions of the invention may also optionally comprise at least one binder material, usually silica, alumina, silica-alumina and mixtures thereof. The binder material may be present in the catalyst in an amount of up to about 50 wt %, preferably from about 1 to about 50 wt % of the catalyst composition.

Catalytic cracking catalysts in accordance with the present invention may also optionally include clay. While kaolin is the preferred clay component, it is also contemplated that other clays, such as pillard clays and/or modified kaolin (e.g. metakaolin), may be optionally included in the invention catalyst. When used, the clay component will typically comprise up to about 90 wt %, preferably about 20 to about 80 wt %, of the catalyst composition.

The particle size and attrition properties of the cracking catalyst affect fluidization properties in the catalytic cracking unit and determine how well the catalyst is retained in the commercial unit, especially in an FCC unit. When used as a catalytic cracking catalyst, compositions of the invention will typically have a mean particle size of about 40 to about 150 µm, more preferably from about 60 to about 120 µm.

Catalytic cracking catalyst compositions in accordance with the present invention are formed from an aqueous slurry which comprises about 10 to about 90 parts by weight of the zeolite component, and optionally, from about 0 to about 90 wt % of clay and matrix materials and/or binder. The zeolite is preferably pre-exchanged with cations of zinc and/or at least one heavy rare earth element prior to incorporation into the aqueous slurry. In the alternative, the aqueous slurry comprises a salt solution of zinc and at least one heavy rare element in addition to the zeolite component and optionally clay and matrix materials. It is also within the scope of the present invention that one of the zinc or the heavy rare earth components is pre-exchanged on the zeolite while the other component is provided in the aqueous slurry in a salt solution.

The aqueous slurry is milled to obtain a homogeneous or substantially homogeneous slurry and to ensure that all the solid components of the slurry have an average particle size of less than 20 microns. Alternatively, the components forming the slurry are milled prior to forming the slurry to provide solids having an average particle size of less than 20 microns within the slurry. The slurry is thereafter mixed to obtain a homogeneous or substantially homogeneous aqueous slurry.

The aqueous slurry is thereafter subjected to a spraying step wherein the slurry is spray dried using conventional spray drying techniques. During the spray drying step, the slurry is converted to a particulate solid composition. The spray dried catalyst particles typically have an average particle size on the order of about 40 to about 150 microns.

Following spray drying, the catalyst particles are calcined at temperatures ranging from about 150° C. to about 700° C. for a period of about 2 hours to about 10 minutes. Where the zinc and/or rare earth component has not been previously incorporated into catalyst, or impregnated onto the catalyst, the preformed catalyst particles may optionally be ion exchanged with zinc and/or heavy rare earth cations, in an amount sufficient to provide from about 0.15 to about 15 wt % zinc and from about 0.22 to about 22 wt % heavy rare earth cations in the final catalyst composition. Alternatively, the catalyst particles may be impregnated, e.g. via incipient wetness, with an aqueous salt solution of zinc and/or heavy rare earth cations to impregnate zinc and the heavy rare-earth cations onto the calcined catalyst particles. The catalyst particles may thereafter by washed, preferably with water and the washed catalyst particles are separated from the slurry by conventional techniques, e.g. filtration, and dried to lower the moisture content of the particles to a desired level, typically at temperatures ranging from about 100° C. to about 300° C.

The primary components of FCC catalyst compositions in accordance with the present invention comprise zeolite, zinc, heavy rare earth, and optionally, clay, binders and matrix materials. It is further within the scope of the present invention that catalyst compositions of the invention may be used in combination with other additives conventionally used in a catalytic cracking process, e.g. $SO_x$ reduction additives, $NO_x$ reduction additives, gasoline sulfur reduction additives, CO combustion promoters, additives for the production of light olefins, and the like.

Cracking catalyst compositions of the invention are especially useful under catalytic cracking conditions to convert hydrocarbon feedstocks into lower molecular weight compounds. For purposes of this invention, the phrase "catalytic cracking conditions" is used herein to indicate the conditions of a typical catalytic cracking process which involves circulating an inventory of cracking catalyst in a catalytic cracking process, which presently is almost invariably the FCC process. For convenience, the invention will be described with reference to the FCC process although the present cracking process could be used in the older moving bed type (TCC) cracking process with appropriate adjustments in particle size to suit the requirements of the process. Apart from the addition of the catalyst composition of the invention to or as the catalyst inventory, the manner of operating the process will remain unchanged. Thus, in combination with the catalyst compositions of the invention, conventional FCC catalysts may be used, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica-alumina, a Y type acidic zeolitic active component, one or more matrix aluminas and/or silica-aluminas, and fillers such as kaolin clay. The Y zeolite may be present in one or more forms and may have been ultra-stabilized and/or treated with stabilizing cations such as any of the rare earths.

The term "catalytically cracking active" or catalytic cracking activity" is used herein to alternatively indicate the ability to catalyze the conversion of hydrocarbons to lower molecular weight compounds under catalytic cracking conditions.

Somewhat briefly, the FCC process involves the cracking of heavy hydrocarbon feedstocks to lighter products by contact of the feedstock in a cyclic catalyst recirculation cracking process with a circulating fluidizable catalytic cracking catalyst inventory consisting of particles having a size ranging from about 20 to about 150 µm. The catalytic cracking of these relatively high molecular weight hydrocarbon feedstocks result in the production of a hydrocarbon product of lower molecular weight. The significant steps in the cyclic FCC process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;
  (ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is oxidatively regenerated in a catalyst regeneration zone to produce hot, regenerated catalyst which is then recycled to the cracking zone for cracking further quantities of feed.

Typical FCC processes are conducted at reaction temperatures of 480° C. to 600° C. with catalyst regeneration temperatures of 600° C. to 800° C. As it is well known in the art, the catalyst regeneration zone may consist of a single or multiple reactor vessels. The compositions of the invention may be used in FCC processing of any typical hydrocarbon feedstock. As will be understood by one skilled in the arts, the useful amount of the invention catalyst compositions will vary depending on the specific FCC process. Typically, the amount of the invention catalyst compositions useful in an FCC process is at least 0.1 wt %, preferably from about 0.1 to about 100 wt %, of the cracking catalyst inventory.

Cracking catalyst compositions of the invention may be added to the circulating FCC catalyst inventory while the cracking process is underway or they may be present in the inventory at the start-up of the FCC operation. The catalyst compositions may be added directly to the cracking zone or to the regeneration zone of the FCC cracking apparatus, or at any other suitable point in the FCC process. As will be understood by one skilled in the arts, the amount of catalyst used in the cracking process will vary from unit to unit depending on such factors as the feedstock to be cracked, operating conditions of the FCCU and desired output. Typically, the amount of catalyst used will range from about 1 gm to about 30 gm for every 1 gm of feed. The catalyst of the invention may be used to crack any typical hydrocarbon feedstock. Cracking catalyst compositions of the invention are particularly useful for cracking heavy hydrocarbon feedstocks, e.g. feedstocks wherein greater than 5% of the feed boils at a temperature of greater than 538° C.

Advantageously, FCC catalyst compositions of the invention exhibit increased sulfur reduction of cracked petroleum product, in particular gasoline product, while simultaneously increasing hydrocarbon conversion. Significant reductions in gasoline sulfur can be achieved using catalysts in accordance with the present invention. In some cases up to about 70% relative to the base case using a conventional cracking catalyst, at constant conversion, using the preferred form of the catalyst described above. Gasoline sulfur reduction of 45% is readily achievable with catalysts according to the invention, as shown by the Examples below. The extent of sulfur reduction may depend on the original organic sulfur content of the cracking feed, with the greatest reductions achieved with the higher sulfur feeds. Sulfur reduction may be effective not only to improve product quality but also to increase product yield in cases where the refinery cracked gasoline end point has been limited by the sulfur content of the heavy gasoline fraction; by providing an effective and economical way to reduce the sulfur content of the heavy gasoline fraction, the gasoline end point may be extended without the need to resort to expensive hydrotreating, with a consequent favorable effect on refinery economics.

To further illustrate the present invention and the advantages thereof, the following specific examples are given. The examples are given as specific illustrations of the claimed invention. It should be understood, however, that the invention is not limited to the specific details set forth in the examples.

For purposes herein, and/or the Examples below, and unless otherwise stated, the following terms have the definitions as indicated below.

"CPS" is used herein to indicate a cyclic propylene steam deactivation procedure which uses propylene and air to simulate the REDOX process in addition to the steaming deactivation effect. (See American Chemical Society Symposium Series, No. 634, Page 171-183(1996).

"ACE" is used herein mean the Advanced Catalyst Evaluation Test as described in U.S. Pat. No. 6,069,012, said reference being herein incorporated by reference.

The surface area as indicated herein was measured by $N_2$ BET method and chemical analysis was perform by ion coupled plasma analysis, standardized to NIST standards.

EXAMPLES

Example 1

Catalyst A in accordance with the present invention was prepared as follows: 8291 grams (2100 g in dry basis) of USY was mixed with 674 g of a mixed rare earth chloride solution containing 27% of a mixed rare earth oxide containing $La_2O_3$ 73%, $CeO_2$ 14%, $Pr_6O_{11}$ 3%, $Nd_2O_3$ 5% and $Sm_2O_3$ 5%, for 10 minutes. Then, 3348 g aluminum chlorhydrol (containing 770 g $Al_2O_3$) and 4859 g (4130 g in dry basis) clay were added in the above slurry and mixed for about 10 minutes. The mixture was milled in a Drais mill to reduce particle size and spray dried in a Bowen spray dryer. The spray-dried particles were calcined for 1 hour at 1100° F. The physical and chemical properties of the finished catalyst are listed in Table 2 below.

Example 2

Catalyst B in accordance with the present invention was prepared as follows: 5487 grams (1500 g in dry basis) of USY was mixed with 459 g of a $ZnCl_2$ solution containing 29.7% Zinc and 1300 g of a $LaCl_3$ solution containing 10% $La_2O_3$ for 3 hours at 90 C. Then, 2391 g aluminum chlorhydrol (containing 550 g $Al_2O_3$) and 3471 g (2950 g in dry basis) clay were added in the above slurry and mixed for about 10 minutes. The mixture was milled in a Drais mill to reduce particle size and spray dried in a Bowen spray dryer. The spray dried particles were calcined for 1 hour at 1100° F. The physical and chemical properties of the finished catalyst are listed in Table 2 below.

Example 3

Catalyst C in accordance with the present invention was prepared as follows: 5487 grams (1500 g in dry basis) of USY was mixed with 459 g of a $ZnCl_2$ solution containing 29.7% Zinc and 1305 g of a $CeCl_3$ solution containing 10% $Ce_2O_3$ for 3 hours at 90 C. Then, 2391 g aluminum chlorhydrol (containing 550 g $Al_2O_3$) and 3471 g (2950 g in dry basis) clay were added in the above slurry and mixed for about 10 minutes. The mixture was milled in a Drais mill to reduce particle size and spray dried in a Bowen spray dryer. The spray-dried particles were calcined for 1 hour at 1100° F. The physical and chemical properties of the finished catalyst are listed in Table 2 below.

Example 4

Catalyst D in accordance with the present invention was prepared as follows: 5487 grams (1500 g in dry basis) of USY was mixed with 459 g of a $ZnCl_2$ solution containing 29.7% Zinc and 1445 g of a $GdCl_3$ solution containing 10% $Gd_2O_3$ for 3 hours at 90 C. Then, 2391 g aluminum chlorhydrol (containing 550 g $Al_2O_3$) and 3471 g (2950 g in dry basis) clay were added in the above slurry and mixed for about 10 minutes. The mixture was milled in a Drais mill to reduce particle size and spray dried in a Bowen spray dryer. The spray dried particles were calcined for 1 hour at 1100° F. The physical and chemical properties of the finished catalyst are listed in Table 2 below.

Example 5

Catalyst E in accordance with the present invention was prepared as follows: 5487 grams (1500 g in dry basis) of USY was mixed with 459 g of a $ZnCl_2$ solution containing 29.7% Zinc and 1525 g of an $ErCl_3$ solution containing 10% $Er_2O_3$ for 3 hours at 90 C. Then, 2391 g aluminum chlorhydrol (containing 550 g $Al_2O_3$) and 3471 g (2950 g in dry basis) clay were added in the above slurry and mixed for about 10 minutes. The mixture was milled in a Drais mill to reduce particle size and spray dried in a Bowen spray dryer. The spray dried particles were calcined for 1 hour at 1100° F. The physical and chemical properties of the finished catalyst are listed in Table 2 below.

Example 6

Catalyst F in accordance with the present invention was prepared as follows: 5487 grams (1500 g in dry basis) of USY was mixed with 459 g of a $ZnCl_2$ solution containing 29.7% Zinc and 1570 g of a $YbCl_3$ solution containing 10% $Yb_2O_3$ for 3 hours at 90 C. Then, 2391 g aluminum chlorhydrol (containing 550 g $Al_2O_3$) and 3471 g (2950 g in dry basis) clay were added in the above slurry and mixed for about 10 minutes. The mixture was milled in a Drais mill to reduce particle size and spray dried in a Bowen spray dryer. The spray dried particles were calcined for 1 hour at 1100° F. The physical and chemical properties of the finished catalyst are listed in Table 2 below.

Example 7

Catalysts A, B, C, D, E and F were deactivated using CPS deactivation protocol at 1450° F. The surface area and unit cell size after deactivations are also listed on Table 2. It is seen that the surface area retention is ranging from 51% to 68% for catalyst B through F. The two cations, that belong to the light rare earth group, La and Ce had lower surface area retention (51 and 57%) while the four cations, that belong to the heavy rare earth group, Gd, Y, Er and Yb had higher surface area retention (60%-68%).

After deactivation, all six catalysts were tested on ACE. The properties of the feed used in the ACE study are listed in Table 3 below.

TABLE 3

Feed Properties

| | Typical Range | Feed A |
|---|---|---|
| API Gravity @ 60° F. | 15-35 | 26.6 |
| Aniline Point, F. | | 182 |
| Sulfur wt % | 0.01-4 | 1.047 |
| Total Nitrogen wt % | 0.02-0.3 | 0.060 |
| Basic Nitrogen wt % | 0.008-0.1 | 0.0308 |
| Conradson Carbon wt % | 0-6 | 0.23 |
| K Factor | 11-12.5 | 11.59 |
| Specific Gravity @ 60° F. | | 0.8949 |
| Refractive Index | | 1.5003 |
| Average Molecular Weight | | |
| Aromatic Ring Carbons, Ca wt % | | |
| Paraffinic Carbons, Cp, wt % | | |
| Naphthenic, Cn, wt % | | |
| Distillation, Initial Boiling Point, ° F. | | |
| IBP | | 358 |
| 5 | | 464 |
| 10 | 290-600 | 511 |

TABLE 2

Physical and Chemical Properties

| | Catalyst | | | | | |
|---|---|---|---|---|---|---|
| | A Base | B Zn—La | C Zn—Ce | D Zn—Gd | E Zn—Er | F Zn—Yb |
| Ionic Radii CN* = 6 | | 1.05 | 1.01 | 0.94 | 0.89 | 0.87 |
| Chemical Analysis, % | | | | | | |
| Al2O3 | 42.33 | 41.18 | 41.70 | 42.15 | 40.98 | 41.89 |
| Na2O | 0.37 | 0.33 | 0.32 | 0.35 | 0.34 | 0.34 |
| ZnO | 0.01 | 3.01 | 3.03 | 3.14 | 2.63 | 2.98 |
| RE2O3 | 2.60 | 2.60 | 2.56 | 2.64 | 0.13 | 0.07 |
| La2O3 | 1.73 | 2.56 | 0.50 | 0.12 | 0.04 | 0.03 |
| CEO2 | 0.32 | 0.03 | 2.01 | 0.41 | 0.03 | 0.02 |
| Gd2O3 | | | | 2.06 | | |
| Er2O3 | | | | | 2.4 | |
| Yb2O3 | | | | | | 2.36 |
| Physicals Properties | | | | | | |
| DI | 2 | 1 | 2 | 2 | 3 | 3 |
| ABD | 0.74 | 0.76 | 0.75 | 0.76 | 0.70 | 0.74 |
| Surface Area, m2/g | 262 | 243 | 235 | 242 | 252 | 240 |
| Zeolite Surface Area, m2/g | 214 | 194 | 186 | 199 | 207 | 194 |
| Matrix Surface Area, m2/g | 48 | 49 | 50 | 43 | 45 | 46 |
| After CPS 145 deactivation | | | | | | |
| Surface Area, m2/g | 169 | 125 | 135 | 155 | 150 | 163 |
| Zeolite Surface Area, m2/g | 134 | 93 | 102 | 124 | 116 | 129 |
| Matrix Surface Area, m2/g | 35 | 32 | 33 | 31 | 34 | 34 |
| % Surface raea retention | 65% | 51% | 57% | 64% | 60% | 68% |
| Cell Size | 24.3 | 24.34 | 24.34 | 24.33 | 24.32 | 24.31 |

TABLE 3-continued

Feed Properties

|  | Typical Range | Feed A |
|---|---|---|
| 20 |  | 579 |
| 30 |  | 626 |
| 40 |  | 673 |
| 50 | 600-900 | 716 |
| 60 |  | 765 |
| 70 |  | 804 |
| 80 |  | 865 |
| 90 | 800-1200 | 937 |
| 95 |  | 1006 |

Figure 2:
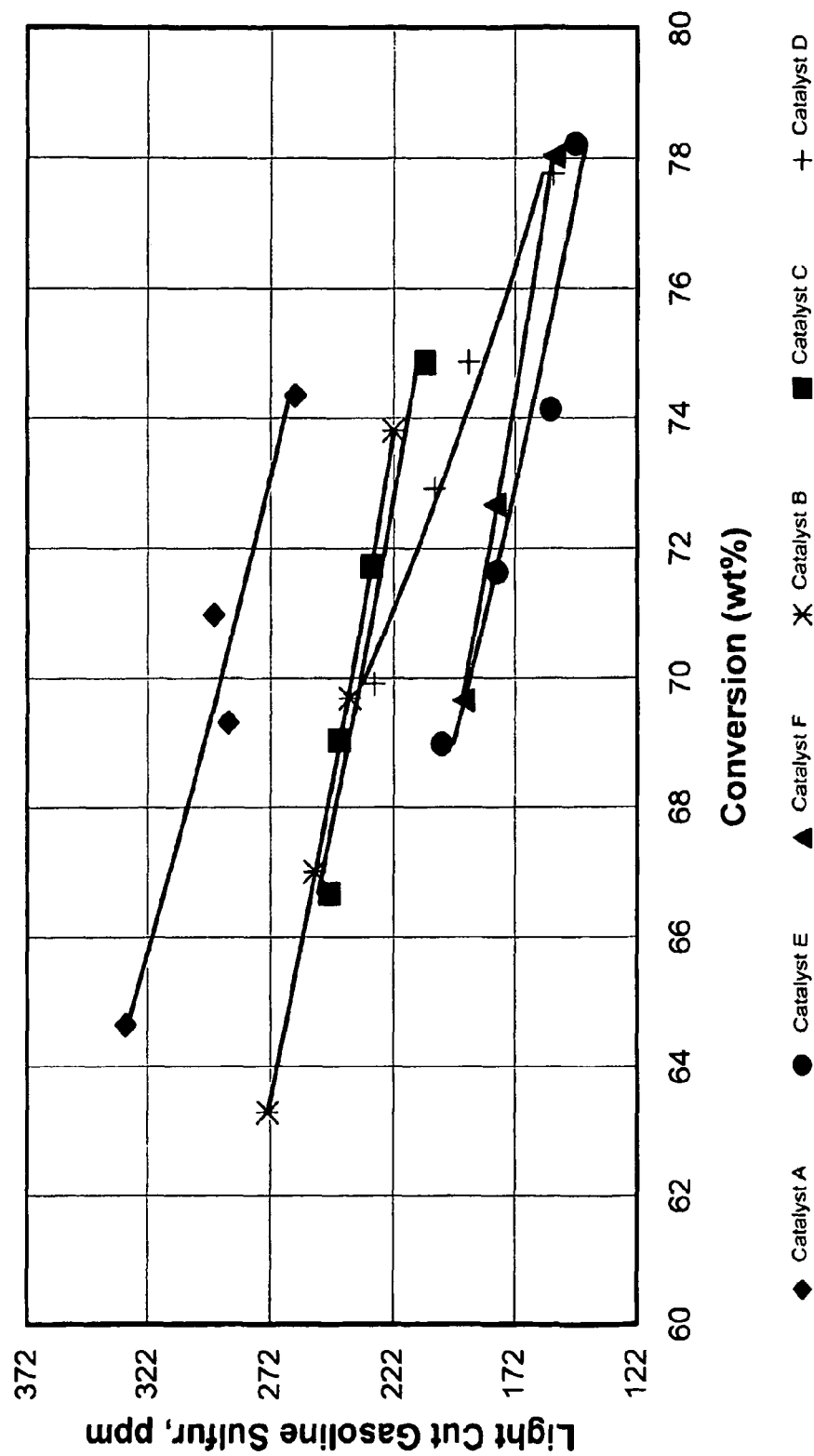
FIG. 2 is a graphic representation of the hydrocarbon conversion (wt %) versus sulfur content (ppm) of cut light cut gasoline product obtained during ACE testing, as described hereinafter, of invention catalysts A, B, C, D, E and F, following deactivation of the catalyst using a CPS protocol, as described hereinbelow.
Figure 3:
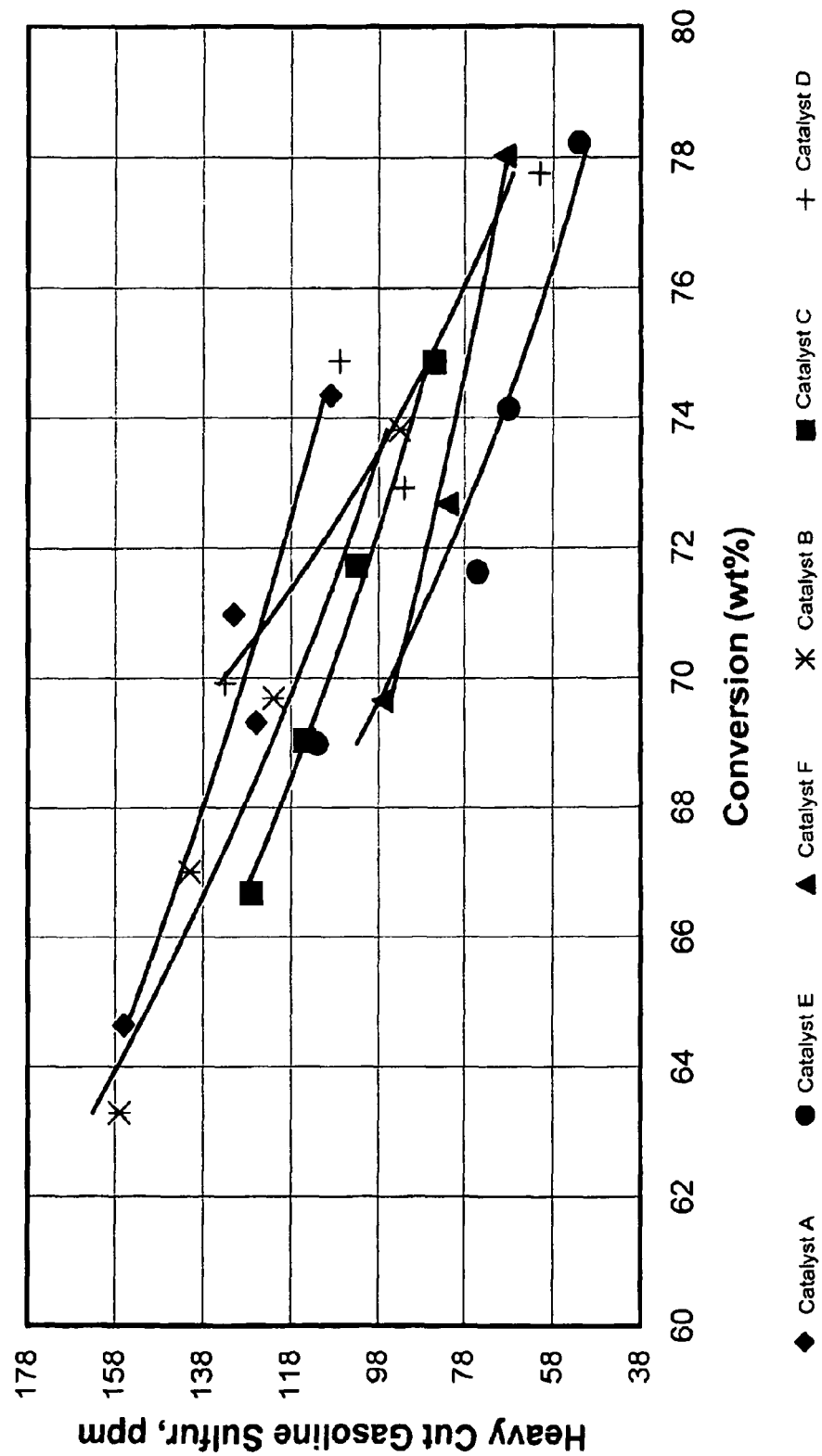
FIG. 3 is a graphic representation of the hydrocarbon conversion (wt %) versus sulfur content (ppm) of heavy cut gasoline product obtained during ACE testing, as described hereinafter, of invention catalysts A, B, C, D, E and F, following deactivation of the catalyst using a CPS protocol, as described hereinbelow.

The products of the cracked feed, sulfur content in the gasoline and sulfur reduction results at 73% conversion of deactivated catalysts are shown in Table 4 and FIGS. 1-3 below.

TABLE 4

Yields at Constant Conversion
Conversion 73

| | Catalyst | | | | | |
|---|---|---|---|---|---|---|
| | A Base | B Zn—La | C Zn—Ce | D Zn—Gd | E Zn—Er | F Zn—Yb |
| Cat-to-Oil Ratio | 7.30 | 7.98 | 7.05 | 5.30 | 5.77 | 5.39 |
| Hydrogen, wt % | 0.04 | 0.22 | 0.25 | 0.19 | 0.25 | 0.30 |
| Total C1's & C2's, wt % | 1.70 | 1.69 | 1.74 | 1.74 | 1.80 | 1.83 |
| Total C3's, wt % | 6.72 | 6.26 | 6.36 | 6.31 | 6.16 | 6.31 |
| Total C4's, wt % | 12.86 | 12.13 | 12.28 | 12.05 | 11.76 | 12.03 |
| C5+ Gasoline, wt % | 48.72 | 48.20 | 47.95 | 48.93 | 48.88 | 48.23 |
| LCO, wt % | 22.41 | 22.58 | 22.49 | 22.57 | 22.73 | 22.85 |
| Bottoms, wt % | 4.59 | 4.42 | 4.51 | 4.43 | 4.27 | 4.15 |
| Coke, wt % | 2.96 | 4.49 | 4.41 | 3.78 | 4.15 | 4.30 |
| Thiophene, ppm | 38 | 35 | 33 | 30 | 26 | 27 |
| Thiophenol, ppm | 5 | 4 | 5 | 4 | 4 | 4 |
| Tetrahydrothiophene, ppm | 20 | 14 | 12 | 13 | 9 | 9 |
| Methylthiophenol, ppm | 7 | 6 | 6 | 5 | 4 | 3 |
| C1-Thiophenes, ppm | 90 | 78 | 77 | 70 | 61 | 64 |
| C2-Thiophenes, ppm | 124 | 99 | 98 | 88 | 75 | 77 |
| C3-Thiophenes, ppm | 58 | 53 | 48 | 48 | 39 | 42 |
| C4-Thiophenes, ppm | 57 | 47 | 46 | 54 | 36 | 41 |
| Benzothiophene, ppm | 212 | 202 | 213 | 181 | 164 | 186 |
| Light Cut Gasoline Sulfur, ppm | 273 | 225 | 221 | 202 | 171 | 178 |
| Heavy Cut Gasoline Sulfur, ppm | 116 | 100 | 95 | 102 | 75 | 83 |
| Cut Gasoline Sulfur, ppm | 388 | 326 | 315 | 305 | 247 | 261 |
| % Sulfur Reduction | | | | | | |
| Light Cut Gasoline Sulfur | | 17% | 19% | 26% | 37% | 35% |
| Heavy Cut Gasoline Sulfur | | 13% | 18% | 12% | 35% | 28% |
| Cut Gasoline Sulfur | | 16% | 19% | 22% | 36% | 33% |

The gasoline sulfur concentration was analyzed by an Agilient 6890 gas chromatograph with an atomic emission detector G2350A (sulfur GC-AED) using techniques similar to those described in Albro et al., "Quantitative Determination of Sulfur Compounds in FCC Gasolines By AED-A study of the Effect of Catalyst Type and Catalytic Conditions on Sulfur Distribution", *Journal of High Resolution Chromatography*, Vol. 16, January 1993. To reduce experimental errors in the sulfur concentration associated with fluctuations in distillation cut point of gasoline, the sulfur species ranging from thiophene to C4-thiophene in syncrude (excluding benzothiophene and higher boiling S species) were quantified and the sum was defined as "cut gasoline sulfur". Similarly, sulfur species ranging from thiophene to C2-thiophene was defined as "light cut gasoline sulfur" and sulfur species ranging from C3-thiophene to C4-thiophene as "heavy cut gasoline sulfur". When benzothiophene is included in the sulfur report, it is referred to as "total gasoline sulfur".

The percentage of cut gasoline sulfur reduction increased from the use of light rare earth cations, e.g. rare earth cations having ionic radii of greater than 0.95 Å at CN equals 6, to heavy rare earth cations. In FIG. 4, the percent cut gasoline sulfur reduction was plotted against ionic radii of each element. A clear trend of increasing sulfur reduction with a decrease of ionic radii was observed. It is also apparent that the rate of the increase in sulfur reduction is much faster from the use of Gd to Yb as compare to the use of Ce to Gd.

We claim:

1. A catalytic cracking catalyst comprising a zeolite, zinc and at least one rare earth element having an ionic radius of less than 0.95 Å at a coordination number of 6;
    wherein zinc is present in the form of cations ionically exchanged into the zeolite; and
    wherein the amount of the rare earth element present in the catalyst ranges from about 0.22 wt % to about 22 wt % of the catalyst;
    wherein the rare earth element is present in the form of cations ionically exchanged into the zeolite, and
    wherein the amount of the ions of rare earth element having an ionic radius of less than 0.95 Å at a coordination number of 6 range from about 10% to about 90% of available exchangeable sites on the zeolite.

2. The catalyst of claim 1 wherein the zeolite is a faujasite type zeolite.

3. The catalyst of claim 2 wherein the zeolite is a Y-type zeolite.

4. The catalyst of claim 1 wherein the rare earth element is selected from the group consisting of europium, gadolinium, terbium, dysprosium, holmium, erbium, thulium, ytterbium, lutetium and mixtures thereof.

5. The catalyst of claim 4 wherein the at least one rare earth element has an ionic radius of less than 0.90 Å at a coordination number of 6.

6. The catalyst of claim 1 wherein the amount of zeolite present in the catalyst ranges from about 5 to about 90 wt % of the catalyst.

7. The catalyst of claim 6 wherein the amount of zeolite present in the catalyst ranges from about 10 to about 60 wt % of the catalyst.

8. The catalyst of claim 1 wherein the amount of zinc present in the catalyst ranges from about 0.15 wt % to about 15 wt % of the catalyst.

9. The catalyst of claim 1 further comprising a matrix and optionally a binder.

10. The catalyst of claim 9 wherein the matrix is selected from the group consisting of alumina, silica, silica-alumina, oxides of transition metals and mixtures thereof.

11. The catalyst of claim 9 wherein the binder is selected from the group consisting of silica, silica alumina, alumina and mixtures thereof.

12. The catalyst of claim 1 wherein the catalyst comprise particles having an average particle size in the range of about 40 to about 150 microns.

13. The catalyst of claim 12 wherein the particles have an average particle size in the range of about 60 to about 120 µm.

14. The catalyst of claim 1 wherein the catalyst further comprises clay.

15. A method of reducing the sulfur content of a catalytically cracked petroleum fraction, said method comprises
catalytically cracking a petroleum feed fraction containing organosulfur compounds at elevated temperatures in the presence of a cracking catalyst comprising zeolite, zinc and at least one rare earth element having an ionic radius of less than 0.95 Å at a coordination of 6;
wherein zinc is present in the form of cations ionically exchanged into the zeolite; and
wherein the amount of the rare earth element present in the catalyst ranges from about 0.22 wt % to about 22 wt % of the catalyst;
wherein the rare earth element is present in the form of cations ionically exchanged into the zeolite, and
wherein the amount of the ions of rare earth element having an ionic radius of less than 0.95 Å at a coordination number of 6 range from about 10% to about 90% of available exchangeable sites on the zeolite.

16. The method of claim 15 wherein the zeolite is a faujasite type zeolite.

17. The method of claim 16 wherein the zeolite is a Y-type zeolite.

18. The method of claim 15 wherein the rare earth element has an ionic radius of less than 0.90 Å at a coordination number of 6.

19. The method of claim 15 wherein the rare earth element is selected from the group consisting of europium, gadolinium, terbium, dysprosium, holmium, erbium, thulium, ytterbium, lutetium and mixtures thereof.

20. The method of claim 15 wherein the amount of zeolite present in the catalyst ranges from about 5 to about 90 wt % of the catalyst.

21. The method of claim 20 wherein the amount of zeolite present in the catalyst ranges from about 10 to about 60 wt % of the catalyst.

22. The method of claim 15 wherein the amount of zinc present in the catalyst ranges from about 0.15 wt % to about 15 wt % of the catalyst.

23. The method of claim 15 further comprising a matrix and optionally a binder.

24. The method of claim 23 wherein the matrix is selected from the group consisting of alumina, silica, silica-alumina, oxides of transition metals and mixtures thereof.

25. The method of claim 23 wherein the binder is selected from the group consisting of silica, silica alumina, alumina and mixtures thereof.

26. The method of claim 15 wherein the catalyst comprise particles having an average particle size in the range of about 40 to about 150 microns.

27. The method of claim wherein the particles have an average particle size in the range of about 60 to about 120 µm.

28. The method of claim 15 wherein the method is a fluid catalytic cracking process.

* * * * *